United States Patent [19]

Boisserand

[11] 4,129,150

[45] Dec. 12, 1978

[54] FLUID DISTRIBUTOR AND FLUID DISTRIBUTOR CELL

[76] Inventor: Marc Boisserand, "Le Placyre", Voiron, France, F-38500

[21] Appl. No.: 783,228

[22] Filed: Mar. 31, 1977

[30] Foreign Application Priority Data

Apr. 5, 1976 [FR] France ................................ 76 09868

[51] Int. Cl.² ............................................ F16K 27/00
[52] U.S. Cl. .................................... 137/872; 137/563; 137/883; 137/884; 137/886
[58] Field of Search ...................... 137/563, 625.5, 872, 137/883, 884, 886; 239/127

[56] References Cited

U.S. PATENT DOCUMENTS 3,977,433  8/1976  Hankinson et al. ............... 251/367 X

*Primary Examiner*—Gerald A. Michalsky
*Attorney, Agent, or Firm*—Larson, Taylor and Hinds

[57] ABSTRACT

A fluid distributor for distributing a fluid into a plurality of flow paths. Each flow path can be individually opened or closed without disturbing the flow of liquid in the other paths. The distributor comprises a plurality of cells, each of which includes an intake orifice which is in fluid communication with a discharge conduit from which the fluid flows for subsequent use and an evacuator conduit from which the fluid flows for eventual recycle to the intake orifice. An obturator is provided which, in one position, stops flow from the intake orifice to the discharge orifice while permitting flow from the intake orifice to the evacuation orifice and which, in its other operative position, stops flow from the intake orifice to the evacuation orifice while permitting flow from the intake orifice to the discharge orifice. Each cell includes valve means to adjust the flow to the evacuation conduit to be the same as that to the discharge conduit. A fluid distributor is made up of a plurality of these cells with the intake orifices in fluid communication. For any given flow to the distributor, the fluid flow through any given discharge conduit is the same irrespective of whether any or all of the other discharge conduits are open or closed since, in either event, the fluid flowing from each intake orifice in each cell is the same irrespective of whether it is to a discharge conduit in that cell or to an evacuation conduit therein.

8 Claims, 3 Drawing Figures

FLUID DISTRIBUTOR AND FLUID DISTRIBUTOR CELL

BACKGROUND OF THE INVENTION

The present invention relates to a fluid distributor cell, and to a fluid distributor produced from such cells.

The objective of the invention is to allow, starting with a given steady flow fluid intake, distribution of the fluid through a variable number of outputs with a flow that will remain constant for each conduit and can be identical from one conduit to the next, independently of the number of conduits that remain closed.

This problem arises in agriculture, for watering or spreading treatment liquids at a number of distinct points in a given terrain, where the liquid discharge must be kept steady and uniform from one point to another even if only specific points are to be supplied, so that the cutting off of the other discharge conduits, corresponding to the points that are not to be supplied, will not modify the output of those that remain open and correspond to the points that are to receive a supply.

Such a problem has, thus far, only been resolved in a very complicated way, with the use of spherical faucet distributors with flap valves or with two valves with opposed diaphragms, and calibrating means to allow compensating regulation as a function of the number of closed conduits, said elements being connected by complicated, cumbersome, impractical piping.

The present invention provides distributors that are of a different design, resolving the above mentioned problem without the need of connecting conduits between the constituent elements, the device being compact and easy to handle.

BRIEF SUMMARY

In accordance with the invention, a fluid distributor is produced by simple tight juxtaposition of identical distributor cells, of a new type, equal in number to the maximum number of discharge conduits to be actuated by the distributor.

Each cell has the form of a block, of rigid material.

It is characterized in that, on the one hand, this block is pierced in the direction of its thickness by at least one fluid intake orifice and an evacuation orifice and, at the inside, in its thickness, by a fluid discharge conduit, an intake port that establishes communication between the intake orifice and the discharge conduit, an evacuation port, an evacuation vent, and an evacuation opening which elements, all three, effect communication between the intake orifice and the evacuation orifice, and further characterized in that on the other hand there are seated inside said block an obturating slide which alternatively closes the intake port or the evacuation port, and a flow regulating device to regulate the flow of fluid evacuated through the vent and evacuation opening, so that its value is equal to that of the flow of fluid through the intake port which penetrates into the discharge conduit, the whole device being such that by maneuvering the slide, the fluid arriving via the intake orifice is taken, with the same flow, either to the discharge conduit, to be utilized, or to the evacuation orifice where, unused, it can be recycled for a new supply to the intake orifice.

The distributor of the invention is produced by simple tight juxtaposition of a plurality of identical cells of this type. It is characterized in that the cells, in number equal to the maximum number of discharge conduits that it is desired to actuate, are each separated from the next following cell by a sealing plate compressed between the said cells and having orifices that effect communication between their intake orifices on the one hand and the evacuation orifices on the other, and further characterized in that the whole is compressed between end sealing plates by two face plates, by means of assembling and tightening devices, one of said two face plates having an intake orifice opposite those of the cells and the other or the same face plate having an evacuation orifice opposite those of the said cells.

DETAILED DESCRIPTION

The invention will be better understood, and other features and advantages thereof will appear more clearly, in the following description and the attached drawings which refer to a preferred embodiment and a variant, cited as non limitative examples.

Figure 1:
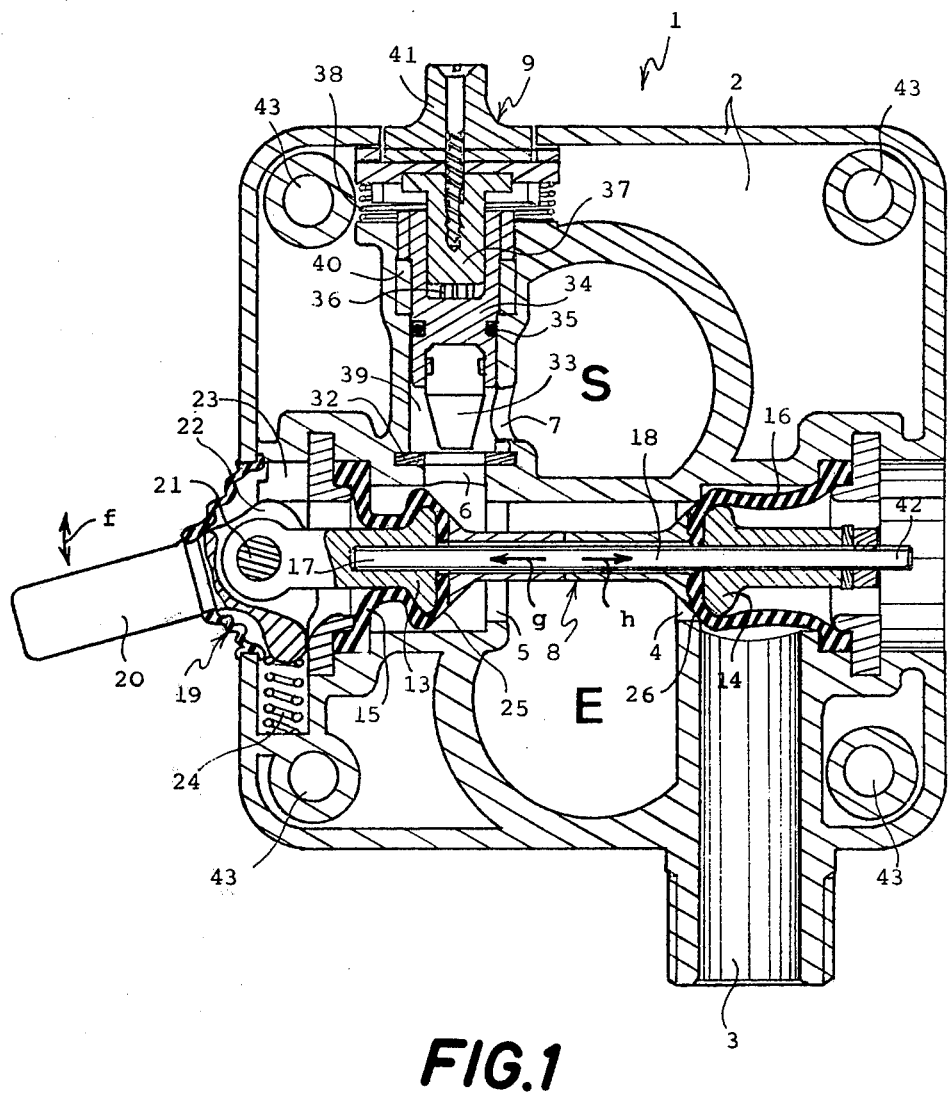
FIG. 1 represents a median section of a fluid distributor cell in a preferred embodiment of the invention.

First with reference to FIG. 1, distributor cell 1 is constituted by a block 2 of rigid material, preferably plastic. Block 2 is pierced in the direction of its thickness by assembly holes 43, by a fluid intake orifice E and by an evacuation orifice S. Block 2 is also pierced at the inside, in its thickness, by a fluid discharge conduit 3, an intake port 4 that effects fluid communication between intake orifice E and discharge conduit 3, by an evacuation port 5, an evacuation vent 6, and an evacuating opening 7, all three of which elements effect fluid communication between intake orifice E and evacuation orifice S. Inside block 2, in its thickness, there are also seated an obturating slide 8, alternatively for obturation of intake port 4 and evacuation port 5, and a flow regulator 9 for the flow of fluid evacuated via evacuation vent 6 and opening 7, to keep it at a value equa to that of the fluid coming through intake port 4 and penetrating into discharge conduit 3. Thus, by maneuvering of the slide (arrows g and h) the fluid arriving via intake orifice E is carried, with the same flow, either to discharge conduit 3 to be utilized, e.g. on a spreading or watering conduit, or to evacuation orifice S to be recycled, unused, for a new supply to intake orifice E.

Slide 8 comprises two obturators 13 and 14 with bellows 15 and 16, joined as a pair by a connecting rod 17, 18, 42, moved in translation for obturation respectively of intake port 14 and evacuation port 5 by a control head 19 constituted by an actuating lever 20 which can be moved in either direction of arrow $f$, articulated by shaft 21 on a cam 22 held against a wedge 23 and urged in stable recall position in each of the two positions of slide 8 by a spring 24. The truncated conical sides 25 and 26 of obturators 13 and 14 respectively are applied to and obturate respectively evacuation port 5 (element 25) and intake port 4 (element 26).

Figure 3:
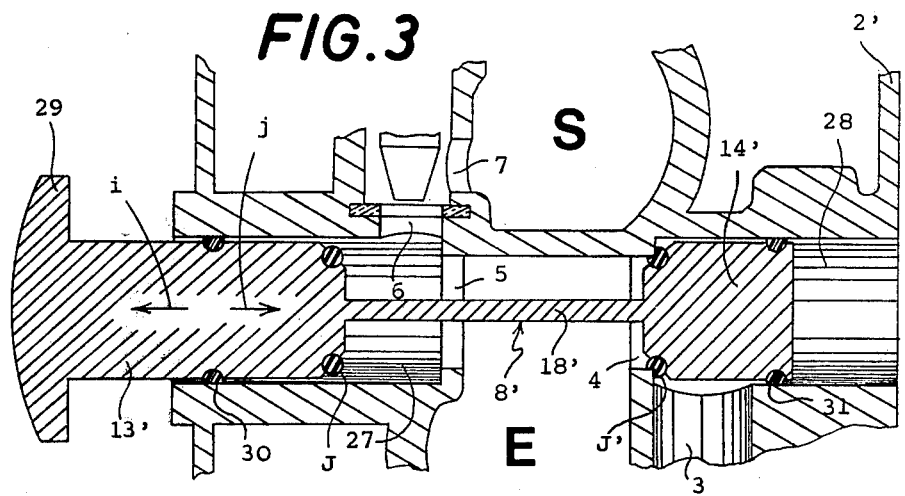
FIG. 3 shows a variant of detail of FIG. 1.

In the alternative embodiment depicted in FIG. 3, slide 8' is constituted by two solid obturators 13' and 14' whose truncated front part presents an annular elastic joint J or J', alternatively applied against and obturating (the first one, J) evacuation port 5 and (the second one, J') intake port 4. These two obturators 13' and 14' are paired by a connecting rod 18', longitudinally moved in the direction of arrows $i$ and $j$ by a pusher device 29.

They slide with seal inside cylinders 27 and 28 in block 2, by an arrangement of packing joints 30 and 31 in recesses hollowed in their respective peripheries.

With reference to FIG. 1, the regulator device 9 is constituted by a nozzle 32 mounted on evacuation vent 6, by a regulator needle 33 borne on a mandrel 34 screwed into the thread 40 of a recess 39 made in block 2, and by a regulator button 41 that is urged to a stable adjusting position by a recall spring 38 and integral with an element 37 for angular driving of mandrel 34, which it drives angularly by means of longitudinal ribs on its periphery which engage in longitudinal grooves 36 inside said mandrel 34. This latter element, held in angular engagement with said element 37, is more or less screwed thereby in recess 39, which causes the advance or retraction of needle 33 with reference to nozzle 32, and thus allows regulation of the flow of fluid evacuated via port 6 and opening 7 precisely to the value of the flow of fluid that, for another position of slide 8, is admitted through intake port 4 into discharge conduit 3.

Figure 2:
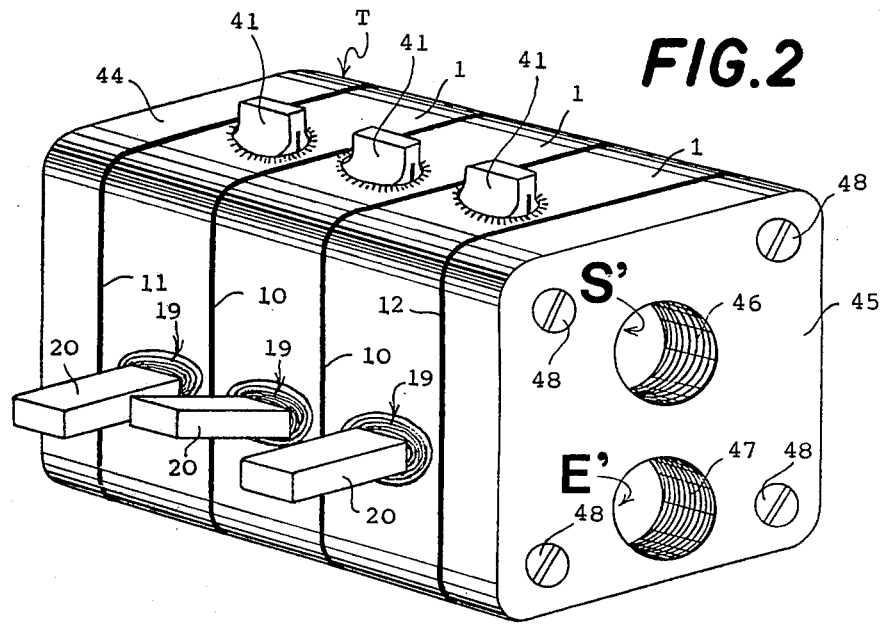
FIG. 2 shows, in isometric projection, a fluid distributor according to this preferred embodiment.

With reference to FIG. 2, fluid distributor T of the invention is made by simple tight juxtaposition of a plurality of cells 1 as described. These cells, in a number equal to the maximum number of discharge conduits to be actuated, are separated, each from the next following, by a sealing plate 10 compressed between said cells and having orifices that effect communication between intake orifices E on the one hand and evacuation orifices S on the other. The whole is compressed between end sealing plates 11 and 12 by two face plates 44 and 45, by assembling and tightening means, screws 48 in the present instance. One of the two face plates, namely 45, which is visible in the drawing, has an intake orifice E' and an evacuation orifice S', disposed respectively opposite intake orifices E and evacuation orifices S of juxtaposed cells 1. These orifices E' and ' are provided, for example, with threads 46 and 47 for connection of an intake conduit and an evacuation conduit respectively. Unused liquid is recycled via the evacuation conduit, without pressure, to be presented once more at the intake orifice E' for the distributor.

By maneuvering lever 20 in the direction of arrow $f$ (FIG. 1) or pusher 29 in the direction of the arrow $i$, (FIG. 3) it is thus possible, with steady flow for each cell, to open the discharge conduit 3 of any desired cells.

What is claimed is:

1. A fluid distributor cell comprising:
   a block of rigid material, said block being pierced in the direction of its thickness by at least one intake orifice and one evacuation orifice;
   a fluid discharge conduit;
   an intake port in fluid communication between said intake orifice and said discharge conduit;
   an evacuation conduit in fluid communication between said intake orifice and said evacuation orifice;
   means for alternatively obturating the flow of liquid from said intake orifice to said discharge conduit and to said evacuation conduit;
   valve means for regulation of the rate of flow of liquid through said evacuation conduit such that, when said discharge conduit is obturated, the flow through said evacuation conduit is at a value equal to that through said discharge conduit when said evacuation conduit is obturated;
   whereby, by actuating said obturating means, a fluid flow introduced into said intake orifice can be carried either to said discharge conduit or, at the same flow rate, to said evacuation orifice.

2. A fluid distributor according to claim 1 further comprising conduit means for recycling fluid from said evacuation orifice to said intake orifice.

3. A fluid distributor according to claim 1 wherein said evacuation conduit comprises an evacuation port in fluid communication with said intake orifice, an evacuation vent in fluid communication with said evacuation port, and an evacuation opening in fluid communication with said evacuation vent and said evacuation orifice, and wherein said valve means comprises a member moveable in said vent to regulate the rate of flow therethrough.

4. A fluid distributor according to claim 1 wherein said obturating means comprises a pair of obturators carried by a connecting rod moveable between a first position in which said discharge conduit is obturated by one of said obturators and said evacuation conduit is in fluid communication with said intake orifice and a second position in which said evacuation conduit is obturated by the other of said obturators and said discharge conduit is in fluid communication with said intake orifice.

5. A fluid distributor according to claim 4 further wherein said obturating means further comprises an actuating lever operably connected to said connecting rod and means urging said lever alternatively into a first stable position in which said obturating means is in said first position and into a second stable position in which said obturating means is in said second position.

6. A fluid distributor according to claim 4 wherein each of said obturators comprises a member positioned for sliding movement in a cylinder and including a first sealing member for obturating its respective conduit and second sealing member forming a seal between the member and the respective cylinder in which it is slideable moveably.

7. A fluid distributor according to claim 3 wherein said valve means comprises a nozzle in the fluid flow path in said evacuation vent, a fluid flow adjusting needle mounted in said evacuation vent for movement relative to said nozzle to regulate the flow therethrough, and means mounted on the exterior of said distributor for moving said adjusting needle into a position such that a rate of flow of fluid from said intake orifice through said evacuation conduit with said discharge conduit obturated will be the same as the rate of flow of fluid through said discharge conduit with said evacuation conduit obturated.

8. A fluid distributor comprising a plurality of cells according to claim 1 in juxtaposition with the intake orifices in alignment and in fluid communication and with said evacuation orifices in alignment and in fluid communication, means closing the ends of the plurality of juxtaposed cells, conduit means for introducing fluid into said intake orifices, and conduit means for permitting egress of fluid from said evacuation orifices, and means securing the plurality of cells in juxtaposed position.

* * * * *